United States Patent
Kao et al.

(10) Patent No.: US 10,540,444 B2
(45) Date of Patent: Jan. 21, 2020

(54) TEXT MINING A DATASET OF ELECTRONIC DOCUMENTS TO DISCOVER TERMS OF INTEREST

(71) Applicant: THE BOEING COMPANY, Chicago, IL (US)

(72) Inventors: Anne Kao, Bellevue, WA (US); Nobal B. Niraula, Memphis, TN (US); Daniel I. Whyatt, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 15/627,977

(22) Filed: Jun. 20, 2017

(65) Prior Publication Data

US 2018/0365216 A1     Dec. 20, 2018

(51) Int. Cl.
| | | |
|---|---|---|
| *G06F 17/30* | (2006.01) | |
| *G06F 17/00* | (2019.01) | |
| *G06F 17/27* | (2006.01) | |
| *G06N 20/00* | (2019.01) | |
| *G06F 16/332* | (2019.01) | |

(52) U.S. Cl.
CPC ...... *G06F 17/2775* (2013.01); *G06F 16/3329* (2019.01); *G06F 17/271* (2013.01); *G06F 17/277* (2013.01); *G06N 20/00* (2019.01)

(58) Field of Classification Search
CPC .................................. G06F 17/30; G06F 17/00
USPC .............................. 707/728, 759, 767; 704/9
See application file for complete search history.

(56) References Cited

U.S. PATENT DOCUMENTS

| | | | |
|---|---|---|---|
| 6,003,808 A | 12/1999 | Nguyen et al. | |
| 7,540,430 B2 | 6/2009 | Jones et al. | |
| 7,831,597 B2 | 11/2010 | Wu et al. | |
| 8,037,086 B1* | 10/2011 | Upstill ................ | G06F 17/2795 707/767 |
| 8,165,972 B1* | 4/2012 | Forman .................. | G06N 20/00 706/12 |
| 8,234,279 B2 | 7/2012 | Wu et al. | |
| 8,346,791 B1* | 1/2013 | Shukla ................ | G06F 16/3325 707/759 |
| 8,719,262 B1* | 5/2014 | Bharat ................ | G06F 16/9535 707/728 |
| 2005/0027691 A1* | 2/2005 | Brin ....................... | G06F 16/245 |
| 2008/0010274 A1* | 1/2008 | Carus ..................... | G06N 20/00 |
| 2008/0126080 A1 | 5/2008 | Saldanha et al. | |

(Continued)

*Primary Examiner* — Seong-Ah A Shin
(74) *Attorney, Agent, or Firm* — Womble Bond Dickinson (US) LLP

(57) ABSTRACT

A method is provided for analyzing and interpreting a dataset composed of electronic documents including free-form text. The method includes text mining the documents for terms of interest, including receiving a set of seed nouns as input to an iterative process an iteration of which includes searching for multiword terms having seed nouns as their head words, at least some of which define a training set of a machine learning algorithm used to identify additional multiword terms at least some of which have nouns outside the set of seed nouns as their head words. The iteration also includes adding the nouns outside the set of seed nouns to the set and thereby identifying a new set of seed nouns for a next iteration. The method includes unifying terms of interest to produce normalized terms of interest for application to generate features of the documents for data analytics performed thereon.

27 Claims, 5 Drawing Sheets

(56) References Cited

U.S. PATENT DOCUMENTS

| | | | |
|---|---|---|---|
| 2009/0083027 A1* | 3/2009 | Hollingsworth | G06F 17/277 704/9 |
| 2011/0047163 A1* | 2/2011 | Chechik | G06F 16/7867 707/741 |
| 2011/0313844 A1* | 12/2011 | Chandramouli | G06Q 30/0241 705/14.42 |
| 2012/0011428 A1* | 1/2012 | Chisholm | G06F 17/241 715/230 |
| 2012/0078918 A1* | 3/2012 | Somasundaran | G06F 17/278 707/748 |
| 2015/0379571 A1* | 12/2015 | Grbovic | G06Q 30/0256 705/14.54 |
| 2016/0188730 A1* | 6/2016 | Delli Santi | G06F 16/9535 707/728 |
| 2017/0185653 A1* | 6/2017 | Huang | G06F 16/2468 |
| 2018/0039691 A1* | 2/2018 | Hazra | G06Q 50/01 |
| 2018/0060340 A1* | 3/2018 | Hazra | G06F 16/90324 |
| 2018/0089300 A1* | 3/2018 | Ahuja | G06F 16/215 |

* cited by examiner status message manifold sensor

FIG. 4A

ADV VB  N   N   N   N  PP ADJ
then saw status message manifold sensor with new

FIG. 4B

ADV   VB   N   N   N   N   PP   DT
then examined engine fuel spar valve with some

FIG. 4C

TEXT MINING A DATASET OF ELECTRONIC DOCUMENTS TO DISCOVER TERMS OF INTEREST

TECHNOLOGICAL FIELD

The present disclosure relates generally to data mining and, in particular, to text mining a dataset of electronic documents to discover terms of interest.

BACKGROUND

Data mining broadly seeks to expose patterns and trends in data, and most data mining techniques are sophisticated methods for analyzing relationships among highly formatted data, such as numerical data or data with a relatively small fixed number of possible values. However, a vast amount of information consists of textually-expressed information, including many database fields, reports, memos, e-mail, web pages, product descriptions, social media, and external news articles of interest to managers, market analysts, and researchers.

Text mining is an extension of the general notion of data mining in the area of free or semi-structured text. In comparison to data mining, text data analysis (also referred to as "text mining" or simply "text analysis") refers to the analysis of text, and may involve such functions as text summarization, text visualization, document classification, document clustering, document summarization, and document cross-referencing. Thus, text data analysis may help a knowledge worker find relationships between individual unstructured or semi-structured text documents and semantic patterns across large collections of such documents.

Research in the area of text mining has its roots in information retrieval, which began around 1960, when researchers started to systematically explore methods to match user queries to documents in a database. However, recent advances in computer storage capacity and processing power, coupled with massive increases in the amount of text available on-line, have resulted in a new emphasis on applying techniques learned from information retrieval to a wider range of text mining problems. Generally speaking, text mining requires the ability to automatically assess and characterize the similarity between two or more sources of text.

In general, text mining depends on the twin concepts of "document" and "term." As used in this disclosure, a "document" refers to a body of free or semi-structured text. The text can include the entire content of a document in its general sense, such as a book, an article, a paper, a data record or the like, or a portion of a traditional document, such as an abstract, a paragraph, a sentence, or a phrase, for example, a title. Ideally, a document describes a coherent topic. In addition, a document can encompass text generated from an image or other graphics, as well as text recovered from audio or video formats.

On the other hand, a document can be represented as collections of "terms," each of which can appear in multiple documents. In some cases, a term can consist of an individual word used in the text. However, a term can also include multiple words that are commonly used together, for example, the part name "landing gear." This type of term is at times referred to as a "multiword term."

Documents such as data records are created in many different applications, such as to provide product description, a record of observations, actions taken or the like. In many instances, the data records are populated by free-form text that is entered by an author in order to document a particular event or activity. In order to sort, interpret, process or otherwise perform data analytics over the data records, it is oftentimes desirable to perform data or text mining to identify particular terms or multiword terms, such as part names, within the data records, and from which particular information may then be identified. For example, it may be desirable to identify every data record that includes a particular part name so as to identify trends or issues or to otherwise discern the current status. Since data records are commonly populated with free-form text, it may be difficult to consistently identify particular part names within the data records. In this regard, different expressions may be utilized to represent the same concepts, such as in the case of synonymous terms for the same concept. Additionally, certain information, such as part names, within a data record may be abbreviated or misspelled or acronyms may be employed which further complicate efforts to consistently identify particular information within the data records.

By way of example, the airline industry relies upon data records entered by personnel in support of their engineering activities and engineering activities of industrial robots during pre-production, production and post-production of an aircraft or other manufactured product. In a more particular example, mechanics create data records relating to the results of inspections, repairs that have been undertaken and the like. The principal job of these mechanics is to maintain the aircraft in conformance with a schedule, such as a flight schedule or a maintenance schedule. These duties typically leave only limited time for documentation of the activities undertaken by the mechanics. As such, the mechanics may create data records in a relatively expedited fashion including, for example, the liberal use of abbreviations and acronyms, some of which are widely understood and some of which are developed ad hoc by the mechanics based upon, for example, the working conditions. As with the creation of any written record, the resulting data records may include spelling errors, erroneous spaces in words, omissions of spaces between words, or other typographical errors. Such misspellings and abbreviations may make it somewhat difficult to identify a particular word within a data record. By way of example, a computer may be referenced within a data record as a "computer," a "comptr," a "compter," a "computor" or a "computo." Complicating the situation, "comp" within a data record may reference a computer; however, it may, instead, reference a compressor, compartment, or a compensator.

The inconsistencies within data records as to the manner in which part names are referenced therefore makes any subsequent identification of part names within the data records a challenge. This challenge is exacerbated by the large number of different part names, such as several thousand part names in the airline industry, with some of the part names only varying slightly from other part names. The challenge may also lead to inaccurate or incomplete data on which engineering or other activities of personnel and industrial robots are performed on a manufactured product, or in some instances on which personnel or industrial robots fail to perform such activities. Within the airline industry, the terminology, including the part names, may vary from airline to airline, from model to model, from fleet to fleet and/or from location to location, thereby further increasing the complexity of any subsequent efforts to analyze the data records. Furthermore, the number of data records may also be substantial and, in some instances, may number in the hundreds of thousands, thereby requiring that any technique for analyzing the data records be quite efficient if it is to be practical.

Therefore it would be desirable to have a system and method that takes into account at least some of the issues discussed above, as well as other possible issues.

BRIEF SUMMARY

Example implementations of the present disclosure are directed to text mining a database of electronic documents to discover terms of interest such as part names or other multiword terms, even in instances in which the electronic documents are populated with free-form text that may include various misspellings, acronyms, abbreviations or the like. Example implementations of the present disclosure discover multiword terms in a reliable and efficient manner that allows performance of data analytics performed on the electronic documents.

The discovery of terms of interest such as part names for manufactured products such as aircraft or other vehicles facilitates a number of data analytics such as to identify manufacturing and supplier quality issues, recognizing duplicated designs across different aircraft models, and generating performance trends, parts inventory and fix effectiveness, which support engineering and other activities performed by personnel and industrial robots on those manufactured products, aircraft or other vehicles. In short, it is often important if not essential to solve a wide variety of quality, safety, operational issues, as well as maintenance and reliability issues, and for managing supply chains and providing effective customer support. However, it is a challenging task as there is little consistency in how parts are actually described in free text, with variations spawned by misspellings, acronyms, abbreviations or the like. Typical parts lists are unable to provide reasonable coverage of parts names as they appear in free text due to variation in expression as described above. Some example implementations of the present disclosure approach this problem with a unique combination of domain knowledge, linguistic knowledge, machine learning and statistical inference to extract part names with minimal of any user input.

The present disclosure thus includes, without limitation, the following example implementations.

Some example implementations provide a method of extracting features from electronic documents for database query processing, the method comprising accessing, by processing circuitry, a memory storing a database composed of a plurality of electronic documents including free-form text; text mining, by the processing circuitry, the plurality of electronic documents including free-form text for terms of interest, including receiving a set of seed nouns as input to an iterative process an iteration of which includes: searching the plurality of electronic documents for occurrences of multiword terms having nouns of the set of seed nouns as their head words, at least some of the multiword terms defining a training set of a machine learning algorithm; using the machine learning algorithm and the training set to identify occurrences of additional multiword terms in the plurality of electronic documents, at least some of the additional multiword terms having nouns outside the set of seed nouns as their head words; storing the training set and at least some of the additional multiword terms in a collection of terms of interest; and adding the nouns outside the set of seed nouns to the set of seed nouns and thereby identifying a new set of seed nouns for input to a next iteration of the iterative process; unifying, by the processing circuitry, terms of interest in the collection of terms of interest to produce a collection of normalized terms of interest from the terms of interest having common or similar words or modifiers; and executing, by the processing circuitry, a database query for features of the plurality of electronic documents from the database using the collection of normalized terms of interest for data analytics performed thereon.

In some example implementations of the method of any preceding or any subsequent example implementation, or any combination thereof, the plurality of electronic documents includes electronic documents that describe maintenance activities for a machine, the terms of interest include names of the machine parts of which the machine is composed, and at least some of the seed nouns define part types of the machine parts.

In some example implementations of the method of any preceding or any subsequent example implementation, or any combination thereof, the training set of the machine learning algorithm includes only those of the multiword terms with at least a threshold number of occurrences in the plurality of electronic documents.

In some example implementations of the method of any preceding or any subsequent example implementation, or any combination thereof, in at least one iteration of the iterative process, the machine learning algorithm and the training set further identify at least one single word term that is also stored in the collection of terms of interest.

In some example implementations of the method of any preceding or any subsequent example implementation, or any combination thereof, the iteration of the iterative process further includes, before the training set is defined or after the occurrences of additional multiword terms are identified, removing or editing, by the processing circuitry, at least one multiword term of the multiword terms or the additional multiword terms consistent with one or more linguistic features of the terms of interest.

In some example implementations of the method of any preceding or any subsequent example implementation, or any combination thereof, the method further comprises, by the processing circuitry, part-of-speech tagged words in the plurality of electronic documents, wherein the at least one multiword term is removed or edited based on a part-of-speech tag of at least one word therein.

In some example implementations of the method of any preceding or any subsequent example implementation, or any combination thereof, the method further comprises, by the processing circuitry, tagging words in the plurality of electronic documents with one or more linguistic features thereof, wherein the machine learning algorithm is configured to use the one or more linguistic features of multiword terms in the training set based on tags of words therein and in words proximate thereto, and identify occurrences of additional multiword terms based on the one or more linguistic features.

In some example implementations of the method of any preceding or any subsequent example implementation, or any combination thereof, the iterative process is performed until a size of the collection of terms of interest, or a number of the nouns outside the set of seed nouns, satisfies predetermined stop criteria.

In some example implementations of the method of any preceding or any subsequent example implementation, or any combination thereof, executing the database query includes executing the database query to search the plurality of electronic documents for one or more electronic documents that reference or are considered to reference a particular normalized term of interest from the collection of normalized terms of interest.

Some example implementations provide an apparatus for extracting features from electronic documents for database query processing. The apparatus comprises a memory storing a database composed of a plurality of electronic documents including free-form text; and processing circuitry configured to access the memory, and execute computer-readable program code to cause the apparatus to at least perform the method of any preceding or any subsequent example implementation, or any combination thereof.

Some example implementations provide a computer-readable storage medium for extracting features from electronic documents for database query processing. The computer-readable storage medium is non-transitory and has computer-readable program code stored therein that in response to execution by processing circuitry, causes an apparatus to at least perform the method of any preceding or any subsequent example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 4A, 4B and 4C illustrate respectively a multiword term of a training set, the multiword term and surrounding words tagged with their parts of speech, and an additional multiword term and surrounding words tagged with their parts of speech, according to example implementations.

DETAILED DESCRIPTION

Figure 1:
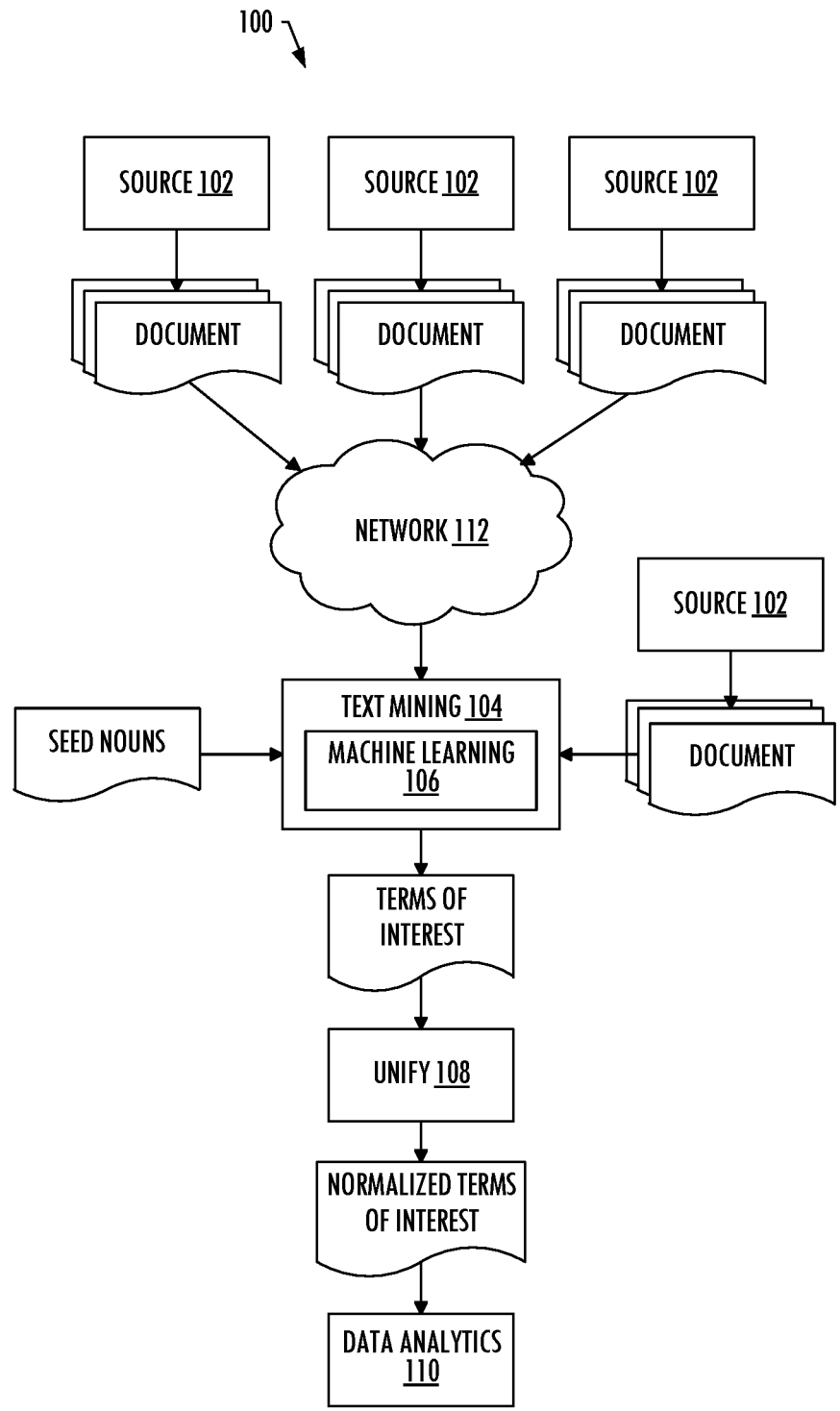
FIG. 1 illustrates a system for extracting features from electronic documents for database query processing, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to data mining, and more particularly directed to text mining a dataset of electronic documents to discover terms of interest such as part names of a machine such as an aircraft or other vehicle.

FIG. 1 illustrates a system 100 for extracting features from electronic documents for database query processing, according to example implementations of the present disclosure. The system may include any of a number of different subsystems (each an individual system) for performing one or more functions or operations. As shown, in some examples, the system includes one or more of each of a source 102 of one or more electronic documents, text mining module 104 that implements a machine learning algorithm 106, a unifying module 108 and a data analytics module 110. The subsystems may be co-located or directly coupled to one another, or in some examples, various ones of the subsystems may communicate with one another across one or more computer networks 112. Further, although shown as part of the system, it should be understood that any one or more of the source, text mining module, machine learning algorithm, unifying module or data analytics module may function or operate as a separate system without regard to any of the other subsystems. It should also be understood that the system may include one or more additional or alternative subsystems than those shown in FIG. 1.

As described herein, a source 102 is a source of one or more of a plurality of electronic documents including free-form text. In some examples, the source includes a memory storing a database composed of the plurality of electronic documents including free-form text. This memory may be located at a single source or distributed across multiple sources. The text mining module 104 is configured to access the memory and text mine the plurality of electronic documents including free-form text for terms of interest. This includes the text mining module being configured to receive a set of seed nouns as input to an iterative process to build a collection of terms of interest.

An electronic document is a document in electronic form, and as described above, a document refers to a body of free or semi-structured text, which can include the entire content of a document in its general sense, such as a book, an article, a paper, a data record or the like, or a portion of a traditional document, such as an abstract, a paragraph, a sentence, or a phrase, for example, a title. Ideally, a document describes a coherent topic. In addition, a document can encompass text generated from an image or other graphics, as well as text recovered from audio or video formats.

A document can be represented as collections of terms, each of which can appear in multiple documents. A term can consist of an individual word used in the text, or a term can include multiple words that are commonly used together (i.e., a multiword term). In some examples, the plurality of electronic documents includes electronic documents (e.g., data records) that describe maintenance activities for a machine such as an aircraft or other vehicle. And in at least some of these examples, terms of interest include names of the machine parts of which the machine is composed, and at least some of the seed nouns define part types of the machine parts.

According to example implementations, an iteration of the iterative process to build the collection of terms of interest includes the text mining module 104 being configured to search the plurality of electronic documents for occurrences of multiword terms having nouns of the set of seed nouns as their head words. At least some of the multiword terms define a training set of the machine learning algorithm 106. In some examples, the training set of the machine learning algorithm includes only those of the multiword terms with at least a threshold number of occurrences in the plurality of electronic documents. As explained below, in one particular implementation, the text mining module is configured to build a digital tree (also referred to as a trie) of words in the electronic documents in which the keys are terms and their values correspond to the numbers of occurrences in the electronic documents.

The iteration of the iterative process to build the collection of terms of interest also includes the text mining module 104 being configured to use the machine learning algorithm 106 and the training set to identify occurrences of additional multiword terms in the plurality of electronic documents, with at least some of the additional multiword terms having nouns outside the set of seed nouns as their head words. Although the machine learning algorithm and training set more often identify multiword terms, it should be understood that in some examples, the machine learning algorithm and the training set identify one or more single word terms. Conditional random fields (CRFs) are a class of suitable machine learning algorithm according to some examples, although other machine learning algorithms are also suitable. The iteration further includes the text mining module being configured to store the training set and at least some of the additional multiword terms in a collection of terms of interest, and add the nouns outside the set of seed nouns to the set of seed nouns and thereby identify a new set of seed nouns for input to a next iteration of the iterative process.

In some examples, the text mining module 104 is configured to further tag words in the plurality of electronic documents with one or more linguistic features thereof. These linguistic features may include features in a number of different subfields of linguistics, including, for example, syntax, lexicon, semantics and the like. The tags may therefore include, for example, part-of-speech tags, lexicon tags, semantic tags and the like. In a more particular example, the text mining module is configured to part-of-speech tag words in the plurality of electronic documents. In at least some examples in which the words are tagged (e.g., part-of-speech tagged), the machine learning algorithm 106 is configured to use the linguistic feature(s) of multiword terms in the training set based on tags of words therein and in words proximate thereto, and identify occurrences of additional multiword terms based on the linguistic feature(s).

In some examples, the iteration of the iterative process further includes the text mining module 104 being configured to remove or edit at least one multiword term of the multiword terms or the additional multiword terms consistent with one or more linguistic features of the terms of interest. This may occur before the training set is defined and/or after the occurrences of additional multiword terms are identified. In at least some examples in which words are part-of-speech tagged, the text mining module is configured to remove or edit at least one multiword term based on a part-of-speech tag of at least one word therein. More particularly, for example, the text mining module may remove a multiword term that begins with a verb, or remove the verb from the multiword term. This may include, for example, action verbs that may or may not function as verbs in syntax. In instances in which removal of the verb results in a single-word term, the term may be removed as not being a multiword term. In some examples, this operation may be performed with the assistance of a user who may be presented with the multiword terms for editing or removal. Or in some examples, one or more single word terms are kept and stored in the collection of terms of interest.

In some examples, the text mining module 104 is configured to perform the iterative process until a size of the collection of terms of interest, or a number of the nouns outside the set of seed nouns, satisfies predetermined stop criteria. The size of the collection of terms of interest refers to the number of multiword terms in the collection, and the predetermine stop criteria may refer to the number being at least a threshold number of multiword terms in the collection. Or in another example, the predetermined stop criteria may refer to the number of nouns outside the set of seed nouns (added to the set for the new set of seed nouns) being less than a threshold number.

The unifying module 108 is configured to unify terms of interest in the collection of terms of interest to produce a collection of normalized terms of interest (sometimes referred to as "standard terms" or "standard terms of interest") from the terms of interest having common or similar words or modifiers. The data analytics module 110 is configured to execute a database query for features of the plurality of electronic documents from the database using the collection of normalized terms of interest for data analytics performed thereon. In some examples, this includes the data analytics module being configured to search the plurality of electronic documents for one or more electronic documents that reference or are considered to reference a particular normalized term of interest from the collection of normalized terms of interest.

Figure 2:
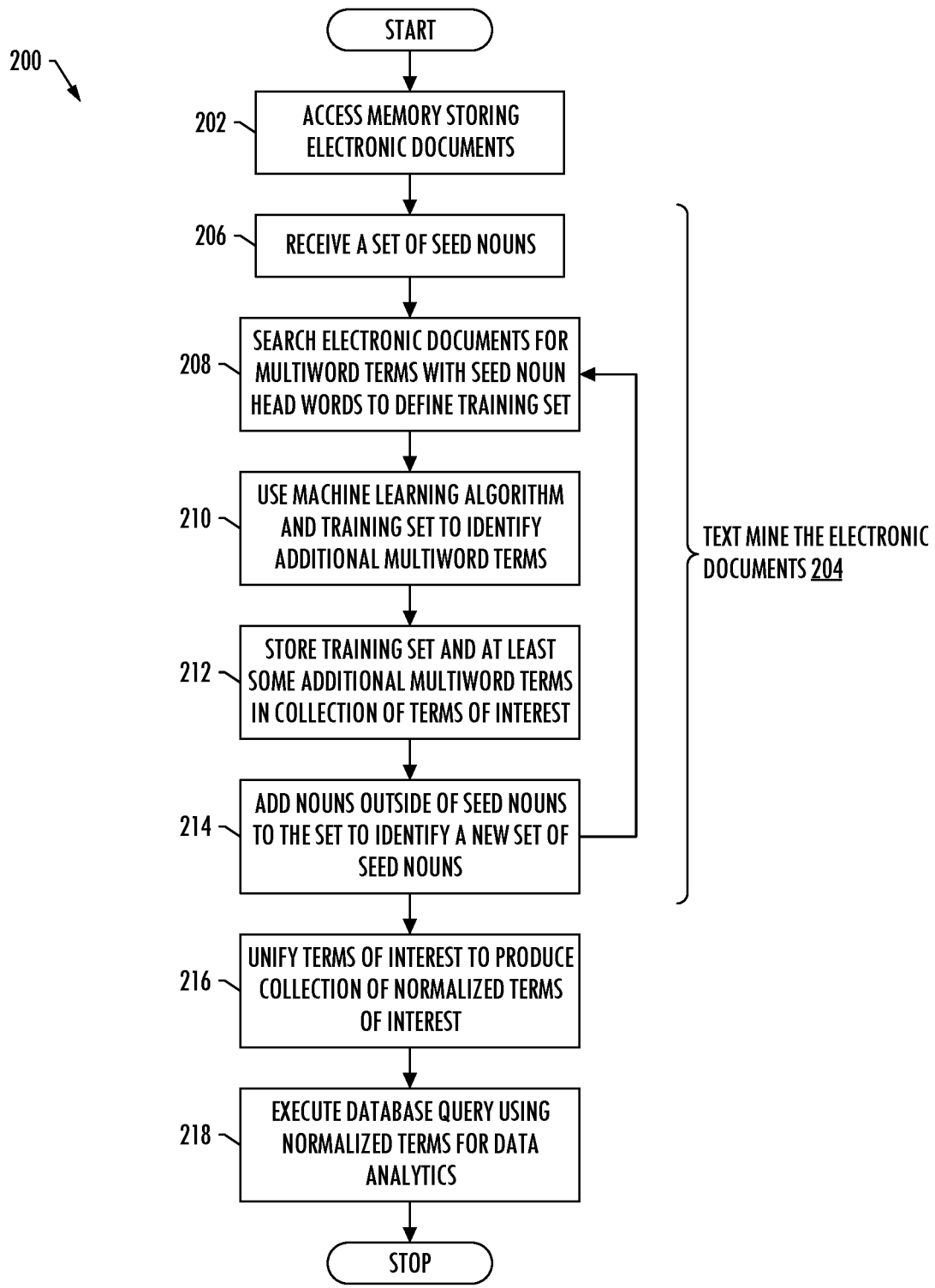
FIG. 2 is a flowchart illustrating various steps in a method of extracting features from electronic documents for database query processing, according to various example implementations.

FIG. 2 is a flowchart illustrating various steps in a method 200 of extracting features from electronic documents for database query processing, according to example implementations of the present disclosure. As shown at block 202, the method includes accessing, by processing circuitry, a memory storing a database composed of a plurality of electronic documents including free-form text. See, for example, FIG. 5, processing circuitry 502 and memory 504. As shown at 204, the method includes text mining, by the processing circuitry, the plurality of electronic documents including free-form text for terms of interest, including, as shown at block 206, receiving a set of seed nouns as input to an iterative process. In the context of part names for an aircraft, for example, seed nouns may include "fan," "valve," "relay," "switch" and similar nouns.

As shown at block 208, an iteration of the iterative process includes searching the plurality of electronic documents for occurrences of multiword terms having nouns of the set of seed nouns as their head words, at least some of the multiword terms defining a training set of a machine learning algorithm. In some examples, this searching includes building a digital tree of words in the electronic documents in which the keys are terms and their values correspond to the numbers of occurrences in the electronic documents. The digital tree uses the seed nouns to find multiword terms, such as "thrust reverser fan," "aft outflow valve," "ac undervoltage sensor relay," "lever lock override switch" and the like.

Figure 3:
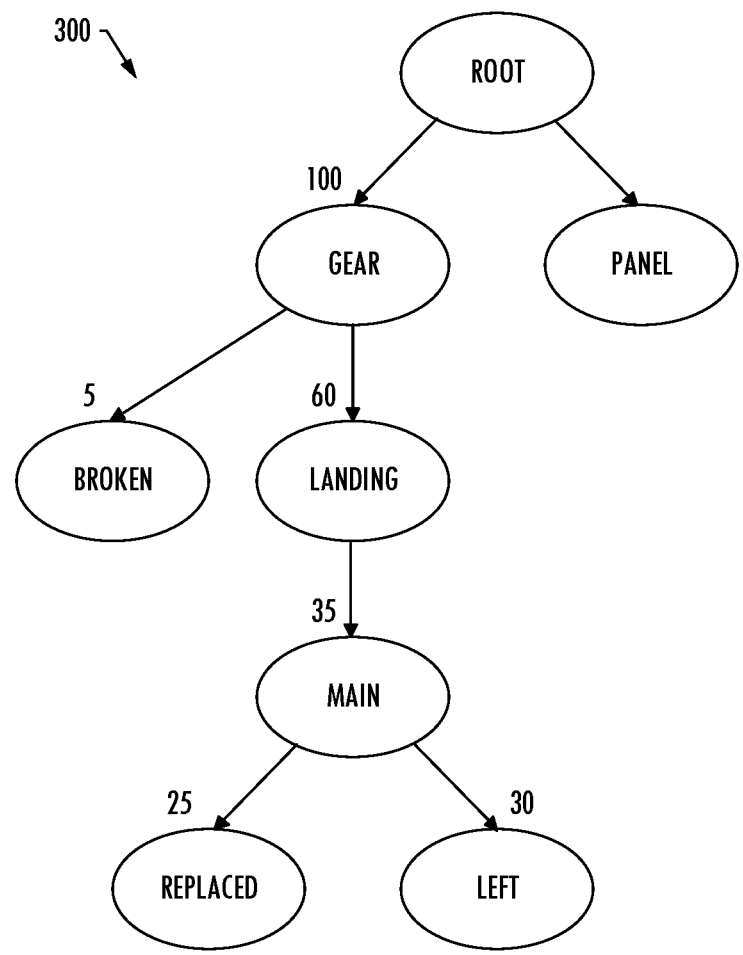
FIG. 3 is an example digital tree according to example implementations.

FIG. 3 is an example of a portion of a digital tree 300 composed of a plurality of nodes that correspond to words of text from an electronic document. The number next to the node is the number of occurrences of the term or multiword term obtained by tracing from the root to that node. In the example shown, the multiword term "main landing gear" appears 35 times in the electronic document. According to some examples, the number of occurrences can be exploited to predict terms of interest, such as by limiting the training set to only those multiword terms with at least a threshold number of occurrences (e.g., "left main landing gear," "replaced main landing gear"). The multiword terms for the training set may be further refined to edit or remove any that have linguistic features inconsistent with terms of interest, such as by editing any beginning with a verb to remove the verb (e.g., "replaced main landing gear").

Returning to FIG. 2, as shown at block 210, the iteration includes using the machine learning algorithm and the training set to identify occurrences of additional multiword terms in the plurality of electronic documents, at least some of the additional multiword terms having nouns outside the set of seed nouns as their head words. Examples of suitable additional multiword terms include "datum stab trim actuator," "gust suppression pressure transducer," "integrated standby flight display," "engine anti-ice valve controller" and the like. The iteration also includes storing the training set and at least some of the additional multiword terms in a collection of terms of interest, and adding the nouns outside the set of seed nouns to the set of seed nouns and thereby identifying a new set of seed nouns for input to a next iteration of the iterative process, as shown at blocks 212 and 214. Examples of nouns that may be added to the set of seed nouns include "actuator," "transducer," "display," "controller" and the like.

In some examples, the machine learning algorithm is an implementation of CRFs such as CRF++ that uses the training set and features to learn. The CRF algorithm uses features of the multiword terms, the surrounding words, and the parts of speech of those multiword terms and surrounding words to find additional multiword terms as potential terms of interest. This may include, for example, the CRF algorithm finding patterns in tags (e.g., part-of-speech tags, lexicon tags, semantic tags) applied to multiword terms that are the same as or substantially similar to those of terms of interest.

FIG. 4A illustrates the example multiword term "status message manifold sensor" that could be found in a training set, and FIG. 4B illustrates the multiword term with its surrounding words in an electronic document, along with their respective parts of speech (ADV=adverb, VB=verb, N=noun, PP=preposition, ADJ=adjective). FIG. 4C illustrates an additional multiword term with its surrounding words that may be found in the same or another electronic document using the CRF algorithm and training set, again with their respective parts of speech (DT=determiner). As shown, both the multiword term in the training set and the additional multiword term have the same pattern of four nouns, and even further the same larger pattern with their surrounding words in that the four nouns are bounded by a verb and preposition.

Similar to before one or more of the additional multiword terms may be refined to edit or remove any that have linguistic features inconsistent with terms of interest. New head words may be identified from the additional multiword terms and added to the training set to identify a new training set for the next iteration. In some examples, one or more head words may be removed if inconsistent with lexical item, syntactic structure or semantic structure of interest. This may be performed automatically or with the assistance of a user who may be presented with the new head words from which any may be removed.

Again returning to FIG. 2, as shown at block 216, the method also includes unifying, by the processing circuitry, terms of interest in the collection of terms of interest to produce a collection of normalized terms of interest from the terms of interest having common or similar words or modifiers. This may include, for example, grouping the terms of interest in the collection by head noun and normalizing those groups using similar modifiers. As shown at block 218, the method also includes executing, by the processing circuitry, a database query for features of the plurality of electronic documents from the database using the collection of normalized terms of interest for data analytics performed thereon. As described above, this may include searching the plurality of electronic documents to identify one or more electronic documents that reference or are considered to reference a particular normalized term of interest from the collection of normalized terms of interest.

Sources of data records populated by free-form text such as maintenance records, logbook records and manufacturer communication system messages often contain critical information about aircraft parts, including data on emerging maintenance and safety issues, fix effectiveness, parts reliability, and on parts inventory. In the case of maintenance records that describe maintenance activities, it may be desirable to identify trends in part maintenance or safety. Example implementations of the present disclosure enable the identification of a large list of parts that are actually in the maintenance records, which can be used to identify issues with those parts. This would be a practically impossible task for one to perform manually as it would require searching for the list of parts but also variations in how those parts are expressed in the data.

More particularly, for example, the word "valve" was spelled in data as "val," "valv," "vlv," "valve," "vale," "vlve," "valva," "vlvl," etc. It is typically used in a multiword term such as "air control flow valve," "air flow valve," "airflow valve," "control valve," "flow valve," "bleed valve," "engine bleed air isolation valve," etc. In turn, each of the words "bleed," "isolation," and "engine" has a variety of spellings in the data, which compounds the problem of identifying these parts in a dataset. To facilitate an analysis of the dataset in a number of contexts such as to identify emerging maintenance issues, safety issues, fix effectiveness, parts reliability or parts inventory, example implementations of the present disclosure gather variants of these terms to identify which ones refer to, say, "air flow control valve," and consolidate them all into one selected normalized form, which permits an accurate count for each of the parts involved in these issues and thereby a valuable analysis.

More concisely, a method according to some example implementations includes receiving a set of seed head nouns (e.g., panel, valve etc.). In an iteration an iterative process, the head nouns and a dataset composed of a plurality of electronic documents are used to build a digital tree that captures the occurrences of head nouns and potential modifiers of the head nouns (multiword terms). Subsequent occurrence statistics are used to predict terms of interest (multiword terms of interest), and linguistic features (e.g., part-of-speech tags and known action verbs) are used to filter out impure terms of interest.

The remaining, purified terms of interest are used to generate a training set to build a CRF model (although other machine learning algorithms may be used). The CRF model is then used to predict terms of interest in the dataset. Once again, these multiword terms may be purified and a new set of head nouns may be extracted for the next iteration. In some examples, some of these head nouns are hand-verified by a subject matter expert (SME). The resulting new heads and original seed heads are then combined together as the basis for a new iteration. The iterations continue as long as new head nouns are generated or a given stopping criteria is met (e.g., number of iterations).

There are many advantages of example implementations of the present disclosure. Example implementations exploit domain and linguistic knowledge, e.g., seed head nouns and part-of-speech tags. Generating the original seed heads is straightforward, as only a small number of generic head nouns (e.g., basic parts names) are required, and these can be provided by anyone with some knowledge of the dataset, or by using an existing list (e.g., parts list). The training set for the CRF is automatically generated rather than hand-labeled, which is a costly prerequisite to many machine learning methods.

Example implementations can exploit domain expertise by soliciting user ratings for newly-generated head nouns, which is a much smaller subset of the results. Since head nouns are limited in numbers, providing human ratings in this manner is not time consuming, and once completed, these ratings may be reused in the same or other, similar datasets. Example implementations are scalable to a number of application domains. Even in the context of part names, for example, the same head nouns can be utilized for extracting part names in another related domain. Experiments also confirm that over 4,000 part names can be generated within an hour, which is significantly less time than required by existing techniques.

Once the part names are discovered and unified from a database of electronic documents including free-form text, a database query may be executed to search for electronic documents that reference a part name under variations in spelling, using the normalized or any other of the spellings of the part name. Other applications are also possible, and any of a number of applications may be used to support engineering and other activities performed by personnel and industrial robots on manufactured products such as aircraft or other vehicles. In some applications, the discovered part names, together with information on the electronic documents in which they are referenced, can be stored in a database or document collection for use by additional tools or applications. A few example use cases are summarized below.

A supplier management worker can use the identified information to see whether multiple programs and regions are ordering the same parts. This allows for comparison of pricing on the same part, and opportunities for consolidation of purchasing under larger quantity and bigger discount. The appropriate products (e.g., aircraft) can then be manufactured or maintained using these less costly parts.

A reliability engineer can use the identified information, potentially from multiple operators (e.g., airlines), to see whether maintenance on a certain part has occurred more frequently than expected, or to verify whether the fix performed on the issue has been effectively in the first attempt or second attempt. This information can then be used to in ongoing maintenance of the appropriate products (e.g., aircraft), if not also future manufacture of new products. And in some examples, one or more industrial robots can be programmed to perform maintenance work on the appropriate products using this information.

A manufacturing quality engineer can use the identified information, potentially covering multiple product lines, to see whether an area in manufacturing has more quality issues than expected and develop additional actions such as root cause analysis of the issue. This root cause analysis can then be used in manufacturing and maintenance activities for one or more of the relevant product lines. More particularly, in some examples, one or more industrial robots can be programmed to perform manufacturing or maintenance work on one or more of the relevant product lines using this root cause analysis or its results.

A safety analyst can use the identified information to see whether working on a particular part or utilizing a particular tool seems to cause unacceptable risk in workplace, and whether a new work guideline should be generated to reduce that risk. This may include how work is performed on the particular part, or the tool or how the tool is utilized to perform work on the part. More specifically, in some examples, it may include how an industrial robot is programmed to perform work on the particular part, selection of a tool used by the industrial robot to perform work on the part, or how the industrial robot is programmed to use the tool to perform work on the part.

According to example implementations of the present disclosure, the system 100 and its subsystems including the source 102, text mining module 104, machine learning algorithm 106, unifying module 108 and data analytics module 110 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
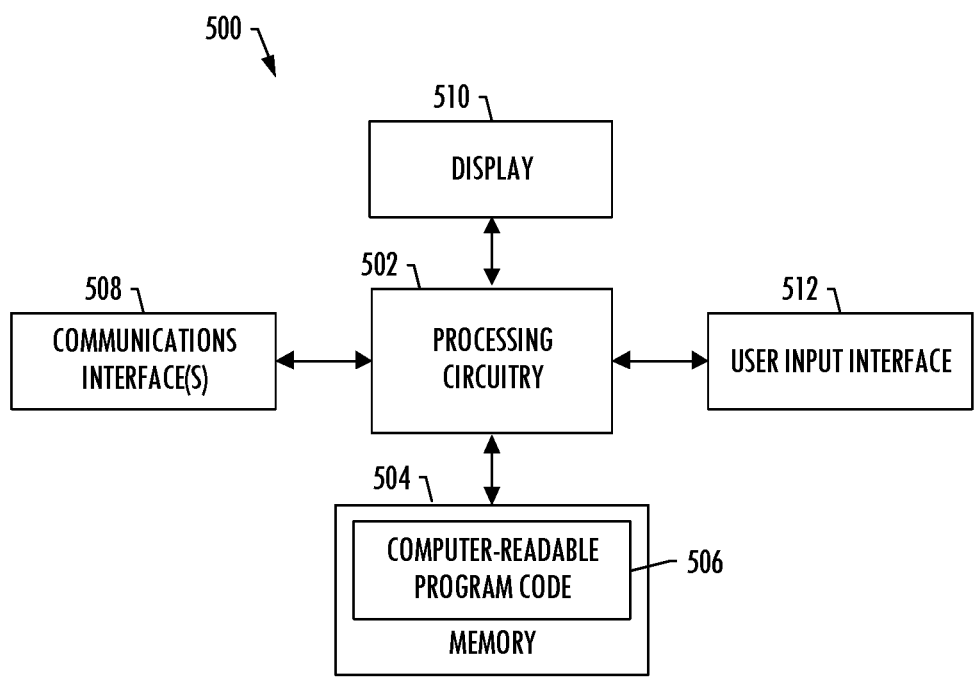
FIG. 5 illustrates an apparatus according to some example implementations.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for extracting features from electronic documents for database query processing, the apparatus comprising:
a memory storing a database composed of a plurality of electronic documents including free-form text; and
processing circuitry configured to access the memory, and execute computer-readable program code to cause the apparatus to at least:
text mine the plurality of electronic documents, including the free-form text for terms of interest, including the apparatus being caused to receive a set of seed nouns as input to an iterative process an iteration of which includes the apparatus being caused to at least:
search the plurality of electronic documents for occurrences of multiword terms linguistically headed by seed nouns of the set of seed nouns, at least some of the multiword terms defining a training set of a machine learning algorithm;
use the machine learning algorithm and the training set, including one or more linguistic features of words in the multiword terms in the training set, to identify occurrences of additional multiword terms in the plurality of electronic documents, the one or more linguistic features including at least one of a part of speech, lexicon or semantic feature, at least some of the additional multiword terms having linguistically headed by nouns outside the set of seed nouns;
store the training set and at least some of the additional multiword terms in a collection of terms of interest; and
add the nouns outside the set of seed nouns to the set of seed nouns and thereby identify a new set of seed nouns for input to a next iteration of the iterative process;
unify terms of interest in the collection of terms of interest to produce a collection of normalized terms of interest from the terms of interest having common or similar words or modifiers; and
execute a database query for features of the plurality of electronic documents from the database using the collection of normalized terms of interest for data analytics performed thereon.

2. The apparatus of claim 1, wherein the plurality of electronic documents includes electronic documents that describe maintenance activities for a machine, the terms of interest include names of the machine parts of which the machine is composed, and at least some of the seed nouns define part types of the machine parts.

3. The apparatus of claim 1, wherein the training set of the machine learning algorithm includes only those of the multiword terms with at least a threshold number of occurrences in the plurality of electronic documents.

4. The apparatus of claim 1, wherein in at least one iteration of the iterative process, the machine learning algorithm and the training set further identify at least one single word term that is also stored in the collection of terms of interest.

5. The apparatus of claim 1, wherein the iteration of the iterative process further includes the apparatus being caused to remove or edit at least one multiword term of the multiword terms or the additional multiword terms consistent with one or more linguistic features of the terms of interest, before the training set is defined or after the occurrences of additional multiword terms are identified.

6. The apparatus of claim 5, wherein the processing circuitry is configured to execute further computer-readable program code to cause the apparatus to further part-of-speech tag words in the plurality of electronic documents, and
wherein the at least one multiword term is removed or edited based on a part-of-speech tag of at least one word therein.

7. The apparatus of claim 1, wherein the processing circuitry is configured to execute further computer-readable program code to cause the apparatus to further tag words in the plurality of electronic documents with the one or more linguistic features thereof, and
wherein the machine learning algorithm is configured to use the one or more linguistic features of multiword terms in the training set based on tags of words therein and in words proximate thereto in the plurality of electronic documents, and identify occurrences of additional multiword terms based on the one or more linguistic features.

8. The apparatus of claim 1, wherein the apparatus is caused to perform the iterative process until a size of the collection of terms of interest, or a number of the nouns outside the set of seed nouns, satisfies predetermined stop criteria.

9. The apparatus of claim 1, wherein the apparatus being caused to execute the database query includes being caused to execute the database query to search the plurality of electronic documents for one or more electronic documents that reference or are considered to reference a particular normalized term of interest from the collection of normalized terms of interest.

10. A method of extracting features from electronic documents for database query processing, the method comprising:
accessing, by processing circuitry, a memory storing a database composed of a plurality of electronic documents including free-form text;
text mining, by the processing circuitry, the plurality of electronic documents including the free-form text for terms of interest, including receiving a set of seed nouns as input to an iterative process an iteration of which includes:
searching the plurality of electronic documents for occurrences of multiword terms linguistically headed by seed nouns of the set of seed nouns, at least some of the multiword terms defining a training set of a machine learning algorithm;
using the machine learning algorithm and the training set, including one or more linguistic features of words in the multiword terms in the training set, to identify occurrences of additional multiword terms in the plurality of electronic documents, the one or more linguistic features including at least one of a part of speech, lexicon or semantic feature, at least some of the additional multiword terms linguistically headed by nouns outside the set of seed nouns;

storing the training set and at least some of the additional multiword terms in a collection of terms of interest; and adding the nouns outside the set of seed nouns to the set of seed nouns and thereby identifying a new set of seed nouns for input to a next iteration of the iterative process;

unifying, by the processing circuitry, terms of interest in the collection of terms of interest to produce a collection of normalized terms of interest from the terms of interest having common or similar words or modifiers; and executing, by the processing circuitry, a database query for features of the plurality of electronic documents from the database using the collection of normalized terms of interest for data analytics performed thereon.

11. The method of claim 10, wherein the plurality of electronic documents includes electronic documents that describe maintenance activities for a machine, the terms of interest include names of the machine parts of which the machine is composed, and at least some of the seed nouns define part types of the machine parts.

12. The method of claim 10, wherein the training set of the machine learning algorithm includes only those of the multiword terms with at least a threshold number of occurrences in the plurality of electronic documents.

13. The method of claim 10, wherein in at least one iteration of the iterative process, the machine learning algorithm and the training set further identify at least one single word term that is also stored in the collection of terms of interest.

14. The method of claim 10, wherein the iteration of the iterative process further includes, before the training set is defined or after the occurrences of additional multiword terms are identified, removing or editing, by the processing circuitry, at least one multiword term of the multiword terms or the additional multiword terms consistent with one or more linguistic features of the terms of interest.

15. The method of claim 14 further comprising, by the processing circuitry, part-of-speech tagging words in the plurality of electronic documents, wherein the at least one multiword term is removed or edited based on a part-of-speech tag of at least one word therein.

16. The method of claim 10 further comprising, by the processing circuitry, tagging words in the plurality of electronic documents with the one or more linguistic features thereof, wherein the machine learning algorithm is configured to use the one or more linguistic features of multiword terms in the training set based on tags of words therein and in words proximate thereto in the plurality of electronic documents, and identify occurrences of additional multiword terms based on the one or more linguistic features.

17. The method of claim 10, wherein the iterative process is performed until a size of the collection of terms of interest, or a number of the nouns outside the set of seed nouns, satisfies predetermined stop criteria.

18. The method of claim 10, wherein executing the database query includes executing the database query to search the plurality of electronic documents for one or more electronic documents that reference or are considered to reference a particular normalized term of interest from the collection of normalized terms of interest.

19. A computer-readable storage medium for extracting features from electronic documents for database query processing, the computer-readable storage medium being non-transitory and having computer-readable program code stored therein that in response to execution by processing circuitry, causes an apparatus to at least:

access a memory storing a database composed of a plurality of electronic documents including free-form text;

text mine the plurality of electronic documents, including the free-form text, for terms of interest, including the apparatus being caused to receive a set of seed nouns as input to an iterative process an iteration of which includes the apparatus being caused to at least:

search the plurality of electronic documents for occurrences of multiword terms linguistically headed by seed nouns of the set of seed nouns, at least some of the multiword terms defining a training set of a machine learning algorithm;

use the machine learning algorithm and the training set, including one or more linguistic features of words in the multiword terms in the training set, to identify occurrences of additional multiword terms in the plurality of electronic documents, the one or more linguistic features including at least one of a part of speech, lexicon or semantic feature, at least some of the additional multiword terms linguistically headed by nouns outside the set of seed nouns;

store the training set and at least some of the additional multiword terms in a collection of terms of interest; and add the nouns outside the set of seed nouns to the set of seed nouns and thereby identify a new set of seed nouns for input to a next iteration of the iterative process;

unify terms of interest in the collection of terms of interest to produce a collection of normalized terms of interest from the terms of interest having common or similar words or modifiers; and execute a database query for features of the plurality of electronic documents from the database using the collection of normalized terms of interest for data analytics performed thereon.

20. The computer-readable storage medium of claim 19, wherein the plurality of electronic documents includes electronic documents that describe maintenance activities for a machine, the terms of interest include names of the machine parts of which the machine is composed, and at least some of the seed nouns define part types of the machine parts.

21. The computer-readable storage medium of claim 19, wherein the training set of the machine learning algorithm includes only those of the multiword terms with at least a threshold number of occurrences in the plurality of electronic documents.

22. The computer-readable storage medium of claim 19, wherein in at least one iteration of the iterative process, the machine learning algorithm and the training set further identify at least one single word term that is also stored in the collection of terms of interest.

23. The computer-readable storage medium of claim 19, wherein the iteration of the iterative process further includes the apparatus being caused to remove or edit at least one multiword term of the multiword terms or the additional multiword terms consistent with one or more linguistic features of the terms of interest, before the training set is defined or after the occurrences of additional multiword terms are identified.

24. The computer-readable storage medium of claim 23 having further computer-readable program code stored therein that in response to execution by the processing circuitry, causes the apparatus to further part-of-speech tag words in the plurality of electronic documents, and wherein the at least one multiword term is removed or edited based on a part-of-speech tag of at least one word therein.

25. The computer-readable storage medium of claim 19 having further computer-readable program code stored therein that in response to execution by the processing circuitry, causes the apparatus to further tag words in the plurality of electronic documents with the one or more linguistic features thereof, and wherein the machine learning algorithm is configured to use the one or more linguistic features of multiword terms in the training set based on tags of words therein and in words proximate thereto in the plurality of electronic documents, and identify occurrences of additional multiword terms based on the one or more linguistic features.

26. The computer-readable storage medium of claim 19, wherein the apparatus is caused to perform the iterative process until a size of the collection of terms of interest, or a number of the nouns outside the set of seed nouns, satisfies predetermined stop criteria.

27. The computer-readable storage medium of claim 19, wherein the apparatus being caused to execute the database query includes being caused to execute the database query to search the plurality of electronic documents for one or more electronic documents that reference or are considered to reference a particular normalized term of interest from the collection of normalized terms of interest.

* * * * *

UNITED STATES PATENT AND TRADEMARK OFFICE
CERTIFICATE OF CORRECTION

PATENT NO. : 10,540,444 B2
APPLICATION NO. : 15/627977
DATED : January 21, 2020
INVENTOR(S) : Anne Kao et al.

Page 1 of 1

It is certified that error appears in the above-identified patent and that said Letters Patent is hereby corrected as shown below:

In the Claims

In Column 15, Claim 1, Line 45, "terms having linguistically headed by nouns" should read -- terms linguistically headed by nouns --.

Signed and Sealed this
Twenty-second Day of December, 2020

Andrei Iancu
*Director of the United States Patent and Trademark Office*